United States Patent [19]

Mainardi et al.

[11] Patent Number: 4,874,298
[45] Date of Patent: Oct. 17, 1989

[54] DOUBLE SELECTABLE DELIVERY PUMP

[75] Inventors: Bruno Mainardi, Padova; Domenico Vivian, Grumolo Delle Abbadesse, all of Italy

[73] Assignee: Nuova Sme S.p.A., Grisignano DI Zocco VI, Italy

[21] Appl. No.: 164,703

[22] Filed: Mar. 7, 1988

[30] Foreign Application Priority Data

Mar. 17, 1987 [IT] Italy .................................. 41554A/87

[51] Int. Cl.$^4$ ........................ F01D 1/30; F04B 39/10; F04B 35/04
[52] U.S. Cl. .................................. 417/315; 417/442; 415/911; 415/148
[58] Field of Search ............... 417/315, 442; 415/146; 137/87, 118

[56] References Cited

U.S. PATENT DOCUMENTS

| | | | |
|---|---|---|---|
| 3,753,601 | 8/1973 | Hensley | 137/118 |
| 4,600,361 | 7/1986 | Bianco | 415/146 |
| 4,653,977 | 3/1987 | Fries | 415/146 |
| 4,728,268 | 1/1988 | Ishii | 417/442 |
| 4,824,332 | 4/1989 | Perkins et al. | 417/442 |

*Primary Examiner*—William L. Freeh
*Attorney, Agent, or Firm*—Guido Modiano; Albert Josif

[57] ABSTRACT

The double delivery pump comprises an impeller with double direction of rotation contained in a body connected to an axial intake conduit and defining a cylindrical seat connected to two tangential rectilinear ducts leading into a distribution seat containing a distribution element. The distribution element can slide in the distribution seat and defines shutters which can cutoff one or the other of two delivery conduits connected to the opposite ends of the distribution seat.

10 Claims, 2 Drawing Sheets

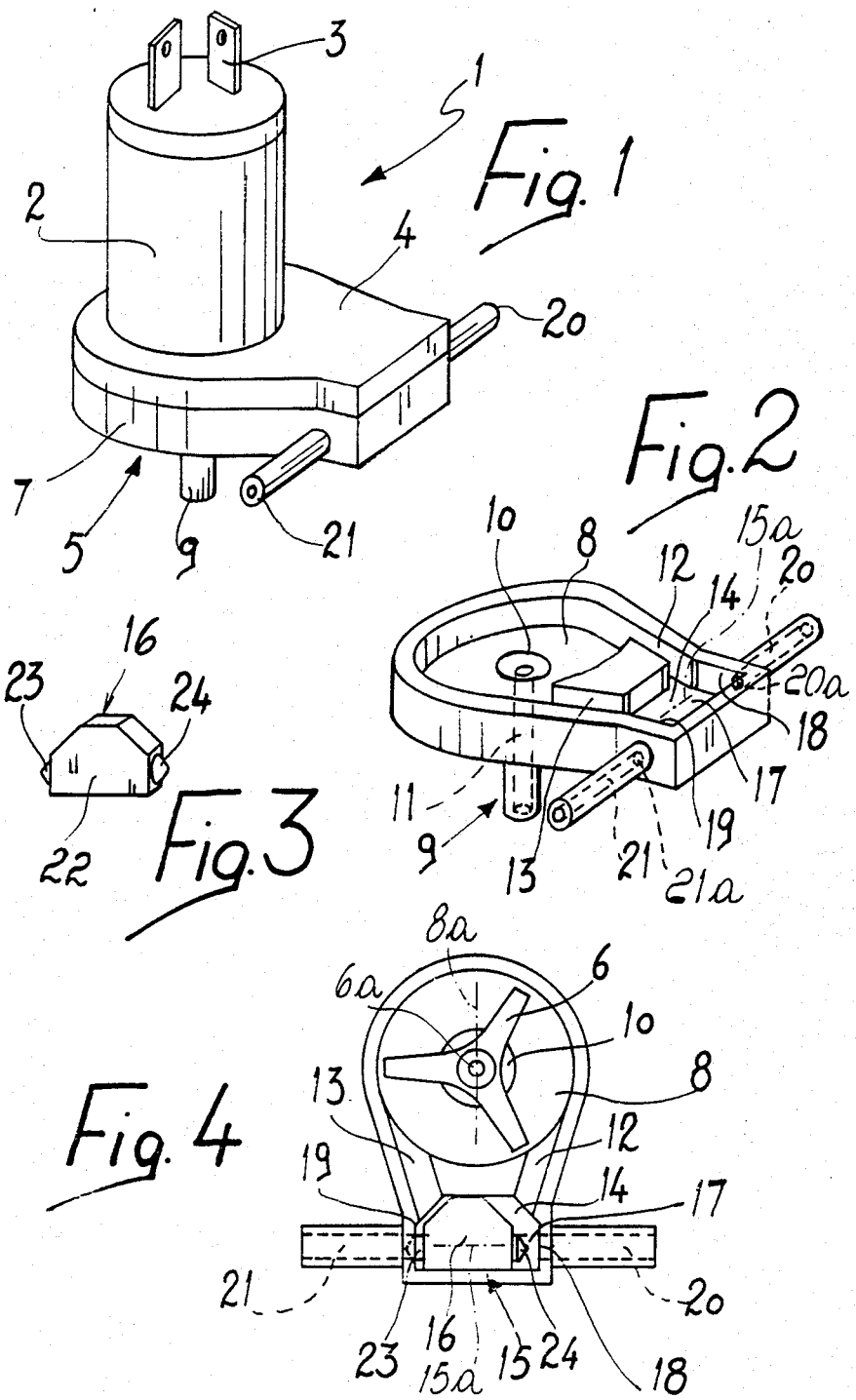

DOUBLE SELECTABLE DELIVERY PUMP

BACKGROUND OF THE INVENTION

The present invention relates to a double selectable delivery pump according to the direction of rotation of the motor or a selectively controlled dual delivery pump.

Various types of double delivery pumps are known in the art which are particularly useful to deliver the washing liquid of the front and rear windscreen wipers of motor vehicles.

All these pumps employ more or less complicated means which simultaneously allow the closure of one of the two ducts and the exit from above of the water drawn from a tank.

Generally, the abovementioned systems employ valves with mechanical actuation derived from the engine or from devices actuated by the pressure of the water.

The disadvantages observed are mainly due to power losses of the motors for the mechanical-actuation types and to high load losses due to considerable deviations to which the water is subject in the other types. Moreover, the performance of the valves is poor.

SUMMARY OF THE INVENTION

The aim of the present invention is to devise a double delivery pump which eliminates the disadvantages described above in known types, and which in particular is not affected by power losses by the motor and which has practically no load losses and in which the performance of the valves is improved.

Within this aim, an important object is to provide a double delivery pump which delivers water at higher pressure than known types.

Another object is to provide a pump which is simple to manufacture and to industrialize.

Yet another object is to provide a pump which can be obtained with conventional machinery and is characterized by efficient valves and low costs.

This aim, as well as these and other objects, are achieved by a double selected delivery pump, comprising a body defining a cylindrical chamber, an impeller with double direction of rotation rotatably arranged in said cylindrical chamber, a compartment in communication with said chamber, delivery conduits in communication with said compartment and valve means controlling the flow of fluid through said delivery conduits, characterized in that said compartment is a seat, said delivery conduits are arranged to open at opposite ends of said seat, duct means being comprised tangentially connected with said cylindrical chamber and opening into said seat near said opposite ends thereof, and wherein said valve means are in the form of a distribution element slidably arranged in said seat, said distributor element having shutter means for alternatively closing the fluid flow through said delivery conduits depending on the rotation direction of said impeller.

BRIEF DESCRIPTION OF THE DRAWINGS

Further characteristics and advantages of the invention will become apparent from the description of a preferred, but not exclusive, embodiment of the double delivery pump, illustrated only by way of non-limitative example in the accompanying drawings, wherein:

FIG. 1 is a perspective view of the pump;

FIG. 2 is a perspective view of the box-like body of the pump according to the invention;

FIG. 3 is a perspective view of a distribution element operating inside the body of FIG. 2;

FIG. 4 is a top view of the body of FIG. 2 containing an impeller and the distribution element.

DESCRIPTION OF THE PREFERRED EMBODIMENTS

Figure 5:
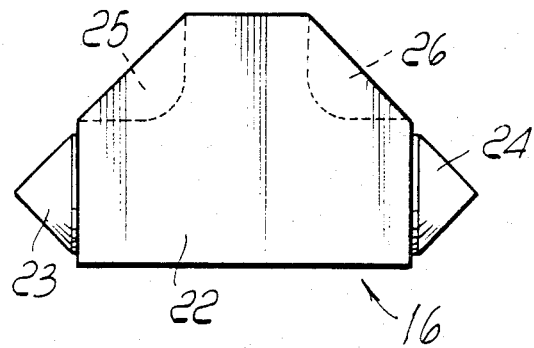
FIGS. 5, 6 and 7 show a side view, a top plan view and a front view of the shutter member of the pump, respectively.

With reference to the above described figures, the double delivery pump is generally indicated by the reference numeral 1, and is composed of a direct-current electric motor 2 enclosed in a cylindrical container of metallic material and provided upwardly with electric connections 3 and downwardly with a base 4 associated with a body 5 of plastics accommodaating a bidirectional rotation pump impeller 6 which is connected to the axis of the abovementioned motor 2.

Said body 5 comprises a monolithic element 7 defining a cylindrical chamber 8 accommodating said rotating impeller 6. The chamber 8 has a diametral axis 8a and the impeller 6 has an axis of rotation 6a.

The cylindrical chamber 8 is axially connected, on the end opposite to the one associated with said base 4, to an intake duct 9 formed by a first funnel-like portion 10 adjacent to said chamber 8 and by a second lower portion 11 having a smaller diameter.

Said cylindrical chamber 8 is tangentially connected to a distribution compartment or seat 15 through two parallelepipedal ducts, respectively 12 and 13, ending at a respective one of two inclined surfaces defining a first portion 14 having the shape of an isosceles trapezoid of the distribution seat 15 for a distribution element 16, a second portion 17 of this seat being contiguous and opening into the first one and having an essentially parallelepipedal shape.

The longer sides of the two portions 14 and 17 are in common. The seat 15 has a center line 15a and opposite sides 15b and 15c.

The second seat portion 17 is connected, on its smaller surfaces on opposite ends indicated at 18 and 19, to two cylindrical delivery conduits 20 and 21 having coinciding axes. The delivery conduits 20 and 21 open into the seat 15 through openings 20a and 21a.

The distribution element 16, of rubber-like material, has substantially the same shape as the seat 15: thus it is formed by an isosceles trapezoid connected to a parallelepiped. However, the base of element 16 is smaller than the one of the cited seat 15 to allow a longitudinal sliding thereof. The distribution element 16, on the smaller sides of its parallelepipedal portion 22, defines two conical shutters or plugs, respectively 23 and 24, having aligned symmetry axes and having such diameter that each of them is capable of completely cutting off and hydraulically sealing the delivery conduits towards which the distribution element has been caused to slide.

Figure 6:
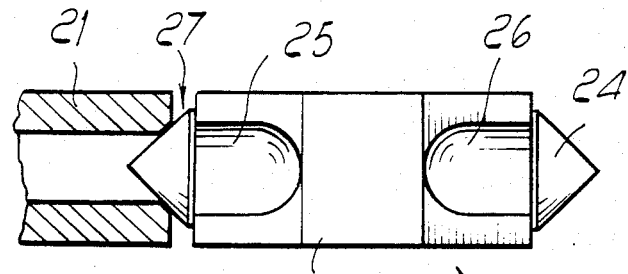
Figure 7:
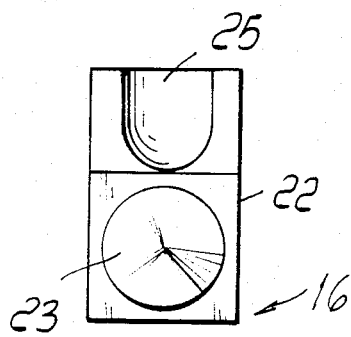

Preferably the diameter of the base of the conical plugs 23 and 24 is greater than the internal diameter of the pipes 20 and 21 as shown in FIG. 6 so that the abutment between the plug and the rim of the pipe occurs at a conical surface portion of the plug thereby allowing a good sealing action and at the same time facilitating the detachment. In this way, in the closing position on interspace 27 is left between the facing walls of the distribution element and the rim of the delivery conduits 20, 21 and the sealing action is not affected by possible thermal dilatations or retractions of the plug diameter. However, if desired the diameter of the base of the plug may correspond to the inner diameter of the pipes 20 and 21. In order to improve the propelling action of the water stream onto the distribution element 16, baffle surface cavities 25 and 26 of concave shape are provided ithe distribution body 16. The angle between the inclined surfaces of the distributor body 16 and the direction of the ducts 12, 13 is also important for the propelling action of the water stream onto the distributor body and this angle is appropriately selected to be optimum. It is important that the distributor element is not much affected by temperature changes and that its inertia is low. It has been found that hexafluoropropylene rubber is suitable for the purpose. While the plug portions 23, 24 may be made integral and of the same material as the shutter body 16, the plug portions 23, 24 may also be made from a material different from the material from the foregoing it will be understood that the distribution element 16 behaves like a plug member freely movable within the seat 15 along the center line 15a thereof of the distributor body 16.

The operation of the pump is as follows: by coupling the intake duct 9 to a water tank and by causing the impeller 6 to perform a clockwise rotatory motion, it draws the water and sucks it preferably into the duct 11 from which it is pushed and deviated towards the delivery conduit 20 and then caused to exit from the pump.

Being forced to follow the above described path, the water, by striking against the corresponding inclined surface of the distribution element 16 and by virtue of the differential pressure, furthermore causes it to slide transversely and to close the conduit 21 with the shutter 23.

Similarly, by causing the impeller 6 to perform an anticlockwise rotation, the water is discharged from conduit 21 and conduit 20 is simultaneously closed.

The inclined surfaces of the distribution element, besides acting as above described, also serve as baffles to better direct the flow of water towards the corresponding delivery conduits, thereby reducing the load losses due to the direction changes of the water.

From what has been described above it is apparent that the invention achieves the intended aim and objects, since the pump according to the invention is not subject to motor power losses and load losses are practically zero.

All this allows water to be sent at a higher pressure than in known pump types.

The invention thus conceived is suscepible to numerous modifications and variations, all of which are within the scope of the inventive concept.

Moreover, all the details may be replaced with other technically equivalent elements.

In practice, the materials employed, as well as the dimensions, may be any according to the requirements.

We claim:

1. Double selected delivery pump, comprising a body defining a cylindrical chamber, an impeller with double direction of rotation rotatably arranged in said cylindrical chamber, a compartment in communication with said chamber, delivery conduits in communication with said compartment and valve means controlling the flow of fluid through said delivery conduits, wherein said compartment is a seat, said delivery conduits are arranged to open at opposite ends of said seat, duct means being comprised tangentially connected with said cylindrical chamber and opening into said seat near said opposite ends thereof, andn wherein said valve means are in the form of a distribution element slidably arranged in said seat, said distributor element having shutter means for alternatively closing the fluid flow through said delivery conduits depending on the rotation direction of said impeller, wherein said ducts which extend from said cylindrical seat have a parallelepipedal shape and end at respective one of two inclined sides of a first isosceles trapezoid-shaped portion of said distribution seat for said distribution element, said distribution seat defining also a second substantially parallelepipedal portion connected to said first portion, said first and second portions having common longer sides.

2. A pump according to claim 1, wherein said distribution seat for said distribution element comprises a first trapezoidal portion connected to said ducts and a second parallelepipedal portion adjacent to said first portion, said second portion defining a base side opposite to said ducts and two opposite smaller sides in communication with said delivery conduits, with said conduits having cylindrical shape and being mutually aligned.

3. A pump according to claim 2, wherein said distribution element comprises an isosceles trapezoidal portion joined to a parallelepipedal portion, said distribution element defining a base surface opposite to said ducts and having smaller dimension than the base side of said distribution seat and being longitudinally slideable.

4. A pump according to claim 2, wherein said distribution element comprises an isosceles trapezoidal portion and a parallelepipedal portion and, on shorter sides of its parallelepipedal portion, defines two conical shutters having coinciding axes and such a diameter to completely and hydraulically sealingly cutoff the respective delivery conduits.

5. A pump according to claim 4, wherein said distribuion element has baffle formations for improving the propelling action of the fluid stream thereon.

6. A selectively controlled dual delivery pump, comprising
a body defining a cylindrical chamber,
a bidirectional rotation pump impeller having an axis of rotation and rotatably arranged in said cylindrical chamber, said cylindrical chamber having a diametral axis perpendicular to said axis of rotation,
means for selectively imparting bidirectional rotation to said impeller,
a compartment contiguous to and in communication with said chamber, said compartment having wall means defining a seat, said seat having a center line extending transverse to said diametral axis and arranged offset to said axis of rotation,
said wall means including end wall means at opposite ends of said center line and extending transverse to said center line and deflining opposite ends of said seat,
said wall means further including spaced apart opposite side wall mens extending in the direction of said center line and defining opposite sides of said seat,
delivery conduits in communication with said compartment,
openings in said opposite ends of said seats, said delivery conduits opening each with one end thereof into said openings respectively, valve means within said seat controlling the flow of fluid through said delivery conduits, said valve means comprising a plug member freely movable within said seat along said center line thereof between said opposite ends of said seat, duct means providing communication between said chamber and said compartment, said duct means being arranged on opposite sides of said diametral axis and each opening tangentially into said cylindrical chamber with one end portion thereof, respectively, and each opening into said compartment with an opposite end portion thereof, respectively in front of said plug member within said seat, said plug member having surface means on opposite ends thereof facing said opposite end portion of each of said duct means, said plug member further having sealing surface means facing said openings in said opposite ends and alternatively closing the fluid flow through one of said openings respectively on one of said opposite ends depending on the direction of rotation of said impeller.

7. A pump according to claim 6, wherein said means for selectively imparting bidirectional rotation to said impeller comprise a direct current electric motor having a base connected therewith and secured to said body and a shaft imparting rotation to said impeller.

8. A pump according to claim 6, wherein said plug member extends parallel to said center line and has baffle surface means for directing water flow towards said openings for said delivery conduits.

9. A pump according to claim 8, wherein said baffle surface means are inclined with respect to said center line.

10. A pump according to claim 8, wherein said baffle surface means have a concave shape facing said openings.

* * * * *